United States Patent [19]

Stretch

[11] Patent Number: 5,085,617

[45] Date of Patent: * Feb. 4, 1992

[54] VANE DAMPER ASSEMBLY FOR A TORQUE CONVERTER

[75] Inventor: Dale A. Stretch, Wixom, Mich.

[73] Assignee: Eaton Corporation, Cleveland, Ohio

[*] Notice: The portion of the term of this patent subsequent to Jan. 7, 2009 has been disclaimed.

[21] Appl. No.: 370,320

[22] Filed: Jun. 22, 1989

[51] Int. Cl.$^5$ .................... F16D 3/80; F16D 47/06
[52] U.S. Cl. .................... 464/27; 192/106.1
[58] Field of Search ............. 464/24, 25, 27, 57, 464/58, 60; 192/106.1

[56] References Cited

U.S. PATENT DOCUMENTS

| | | | |
|---|---|---|---|
| 1,127,154 | 2/1915 | Andersen et al. | 464/58 X |
| 1,630,737 | 5/1927 | Flanders | 464/24 |
| 1,978,922 | 10/1934 | Wemp | 192/70.17 X |
| 3,653,228 | 4/1972 | Tiberio | 464/24 |
| 4,148,200 | 4/1979 | Schallhorn et al. | 464/27 |
| 4,181,208 | 1/1980 | Davis | 192/106.1 |
| 4,398,436 | 8/1983 | Fisher | 74/911 X |
| 4,576,259 | 3/1986 | Bopp | 192/3.21 |
| 4,690,256 | 9/1987 | Bopp et al. | 192/21 |
| 4,781,653 | 11/1988 | Nakamura et al. | 464/58 |
| 4,782,936 | 11/1988 | Bopp | 192/106.2 |
| 4,838,107 | 6/1989 | Herrmann | 464/24 X |
| 4,944,374 | 7/1990 | Casse et al. | 192/3.29 |

FOREIGN PATENT DOCUMENTS 1953196 10/1969 Fed. Rep. of Germany .
2099091 12/1982 United Kingdom .

Primary Examiner—Daniel P. Stodola
Assistant Examiner—William G. Battista, Jr.
Attorney, Agent, or Firm—P. S. Rulon

[57] ABSTRACT

An assembly (19) for damping torsionals in a vehicle driveline. Assembly (19) includes a spring assembly (20) and a vane damper assembly (22) disposed in parallel and immersed in automatic transmission fluid of a torque converter housing (24). The spring assembly (20) isolates driveline torsionals and the damper assembly (22) dissipates the torsionals. The damper assembly (22) includes first and second relatively rotatable housing members (66, 68) respectively connected to the spring assembly output (62b) and input (62a). Members (66, 68) are also frictionally interconnected by surfaces (68a, 74a). Housing members (66, 68) define chambers (78a, 78b) which vary inversely in volume in response to flexing of the spring assembly (20) by the driveline torsionals. The chambers are in communication with the fluid in the torque converter housing via restricted passages (86, 88). As the chambers vary in volume, energy from the torsionals is converted to fluid pressure in the chambers decreasing in volume. The pressure increases the engagement force of the friction surfaces. Lugs (77a) drivingly connecting the second member (68) to the torque housing include valving members (77c, 77d) which close or partially close the passages associated with the chamber decreasing in volume.

5 Claims, 5 Drawing Sheets

VANE DAMPER ASSEMBLY FOR A TORQUE CONVERTER

BACKGROUND OF THE INVENTION

This invention relates to driveline torsion damping mechanisms operable over the entire operational range of a driveline. More specifically, the invention relates to such mechanisms for vehicle drivelines.

It is well-known that the speed of an Otto or Diesel engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality, such pulses are herein also referred to as torsionals.

Since the inception of the automobile, many torsion damping devices or schemes have been proposed and used to isolate and dampen driveline torsionals. For example, master clutches, used in combination with mechanical transmissions, have long employed springs and secondary mechanical friction devices to respectively isolate and dampen torsionals. Typically, torsionals are isolated or absorbed by a plurality of circumferentially spaced, coil springs disposed in parallel between the master clutch primary friction input and splined output. Damping is provided by secondary mechanical friction surfaces disposed in parallel with the springs and biased together with a predetermined force. Damping occurs when the amplitude of the torsionals exceeds the breakaway or slip torque of the secondary friction surfaces. With this arrangement, portions of the torsionals less than the slip torque of the secondary friction surfaces are transmitted directly through the clutch without flexing or isolation by the springs, i.e., the arrangement provides neither torsion isolation nor damping. If the slip torque of the secondary friction surfaces is reduced by design or wear of the secondary surfaces, damping is reduced. Further, any portions of the torsionals greater than the spring energy absorption or storage capacity are also transmitted directly through the clutch. If the spring rate is increased to prevent spring collapse, the springs transmit lesser amplitude torsionals directly through with little or no effective isolation or absorption of the torsionals.

To increase the operational spring range and storage capacity of a torsion damping assembly, Wemp in U.S. Pat. No. 1,978,922, proposed using a low spring rate torsion sleeve capable of flexing substantially more than the coil springs used with master clutches. This arrangement, like the master clutch arrangement, also employs secondary mechanical friction surfaces disposed in parallel and biased together with a predetermined force to provide damping. Hence, the Wemp arrangement also fails to provide isolation and damping of torsionals below the slip or breakaway torque of the secondary friction surfaces. The Wemp arrangement is also underdamped if the slip or breakaway torque of the secondary friction surfaces is reduced.

It is known to dampen driveline torsionals with a vane damper as may be seen by reference to U.S. Pat. No. 4,690,256 to Bopp et al and incorporated herein by reference. In U.S. Patent 4,690,256 there is disclosed a torsion damping assembly immersed in the oil of a torque converter housing. The assembly includes resilient means for transmitting driveline torque between input and output drive, and an expandable chamber mechanism connected in parallel with the resilient means. The mechanism includes first and second relatively movable members connected to opposite ends of the resilient means and defining at least two chambers which vary inversely in volume in response to flexing of the resilient means and which are in communication with the torque converter oil via restricted passages. The restricted passage provide charging of the volumes with torque converter oil to prevent cavitation and control damping by restricting the rate of flow of the volumes. A problem arises when the size of the restricted passages necessary for charging the volumes cause the damping rate of mechanism to drop below critical damping rate of the driveline.

SUMMARY OF THE INVENTION

An object of the present invention is to provide a torsion damping assembly which is effective to isolate and dampen driveline torsionals over substantially the entire operational range of the driveline and which employs fluid pressure to dampen the driveline torsionals.

Another object of the present invention is to provide such an assembly immersed in automatic transmission fluid in a torque converter housing of an automatic transmission and employing the automatic transmission fluid to damp the driveline torsionals.

According to a feature of the present invention, a torsion damping assembly is adapted to be disposed in a driveline torque converter housing filled with uncompressible fluid, immersed in the fluid, and drivingly connected between rotatably mounted input and output drives. The assembly includes resilient means for transmitting driveline torque between the drives and an expandable chamber mechanism for hydraulically damping driveline torsionals. The mechanism includes first and second relatively movable members, means for serially connecting the first member and the resilient means between the drives, and means for drivingly connecting the second member to one of the drives and in parallel driving connection with the resilient means. The members define at least two chambers varying inversely in volume in response to flexing of the resilient means and include passage means for communicating each of the volumes with the oil in the torque converter housing.

The invention is characterized by the means for drivingly connecting the second member to the one drive including valving means for at least partially closing the passage means communicating with the chamber decreasing in volume.

BRIEF DESCRIPTION OF THE DRAWINGS

The torsion damping assembly of the present invention is shown in the accompanying drawings in which.

DETAILED DESCRIPTION OF THE DRAWINGS

Figure 1:
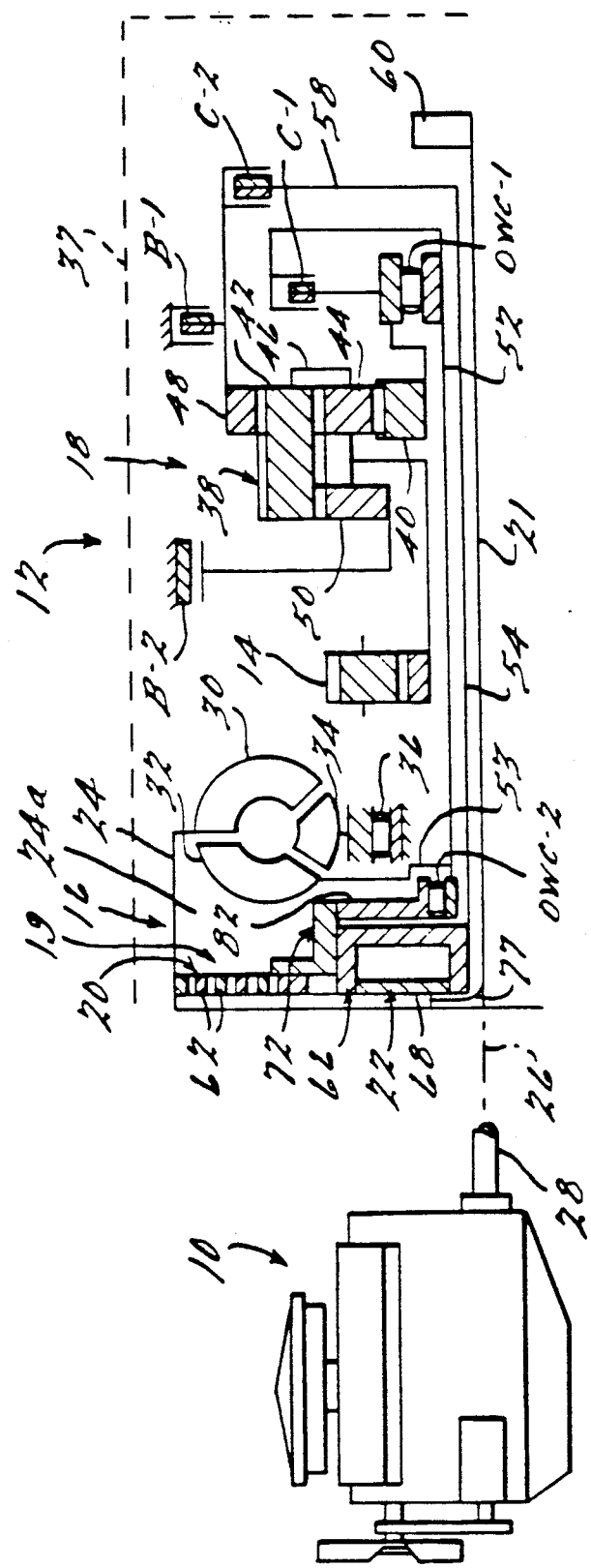
FIG. 1 is a schematic view of a portion of a motor vehicle driveline including the torsion damping assembly of the present invention.

The motor vehicle driveline, seen schematically in FIG. 1, includes an internal combustion engine 10 and an automatic transmission 12 having an output drive or gear 14 for driving a load such as unshown rear and/or front wheels of a vehicle.

The transmission 12 comprises a hydrokinetic fluid coupling or torque converter assembly 16, a ratio section 18, and a torsion damping assembly 19 including a spring assembly 20 and a vane damper assembly 22. Components 16-22 are substantially symmetrical about a rotational axis defined by a shaft 21 of the transmission and are shown only above the axis for simplicity and brevity.

Torque converter assembly 16 is disposed within a torque converter housing 24 rotationally driven by an input drive 26 connected directly to a crankshaft 28 of the engine in any of several well-known manners. Converter assembly 16 may be of any well-known type and includes an impeller 30 driven by housing 24, a turbine 32 driven hydrokinetically by the impeller, and a stator 34 connectable by a one-way roller clutch 36 to a ground such as a non-rotatable portion of the transmission housing represented by phantom lines 37. Torque converter housing 24 is filled with an incompressible fluid or transmission oil which is commonly referred to as automatic transmission fluid (ATF), which lubricates the ratio section 18, and which is often pressurized in the torque converter housing 24.

Transmission 12 is a modified form of the generally known class of split-input torque transmissions disclosed in U.S. Pat. No. 4,398,436 and published British Patent Application No. 2,099,091A, both of which are incorporated herein by reference. Ratio section 18 comprises a planetary gear set 38 controlled by friction clutches C-1 and C-2, one-way clutch OWC-1, and brakes B-1 and B-2 to provide a reverse and three forward speed ratio modes of operation. Planetary gear set 38 includes a first sun gear 40, first and second sets of planetary gears 42, 44 supported by a common planet carrier 46, a ring gear 48, and a second sun gear 50. Sun gear 40 is connectable to a first quill or torque converter driven shaft 52 via clutch C-1 or clutch OWC-1. Shaft 52 is in turn connected to turbine 32 via a radially extending member 53. The first and second sets of planetary gears are respectively in constant mesh with each other, with sun gears 40 and 50, and with ring gear 48. Planetary carrier 46 is in constant or direct driving relation with output gear 14. Ring gear 48 is connectable to ground via brake B-1 or to a second quill shaft 54 via clutch C-2. Shaft 54 is connected at its left end to the vane damper 22 and at its right end to clutch C-2 via a radially extending flange or spider 58. Sun gear 50 is in constant mesh with planetary gears 42 and is connected to ground via brake B-2. Ratio section 18 further includes an oil pump 60 driven by shaft 21 for pressurizing the ATF.

Figure 2:
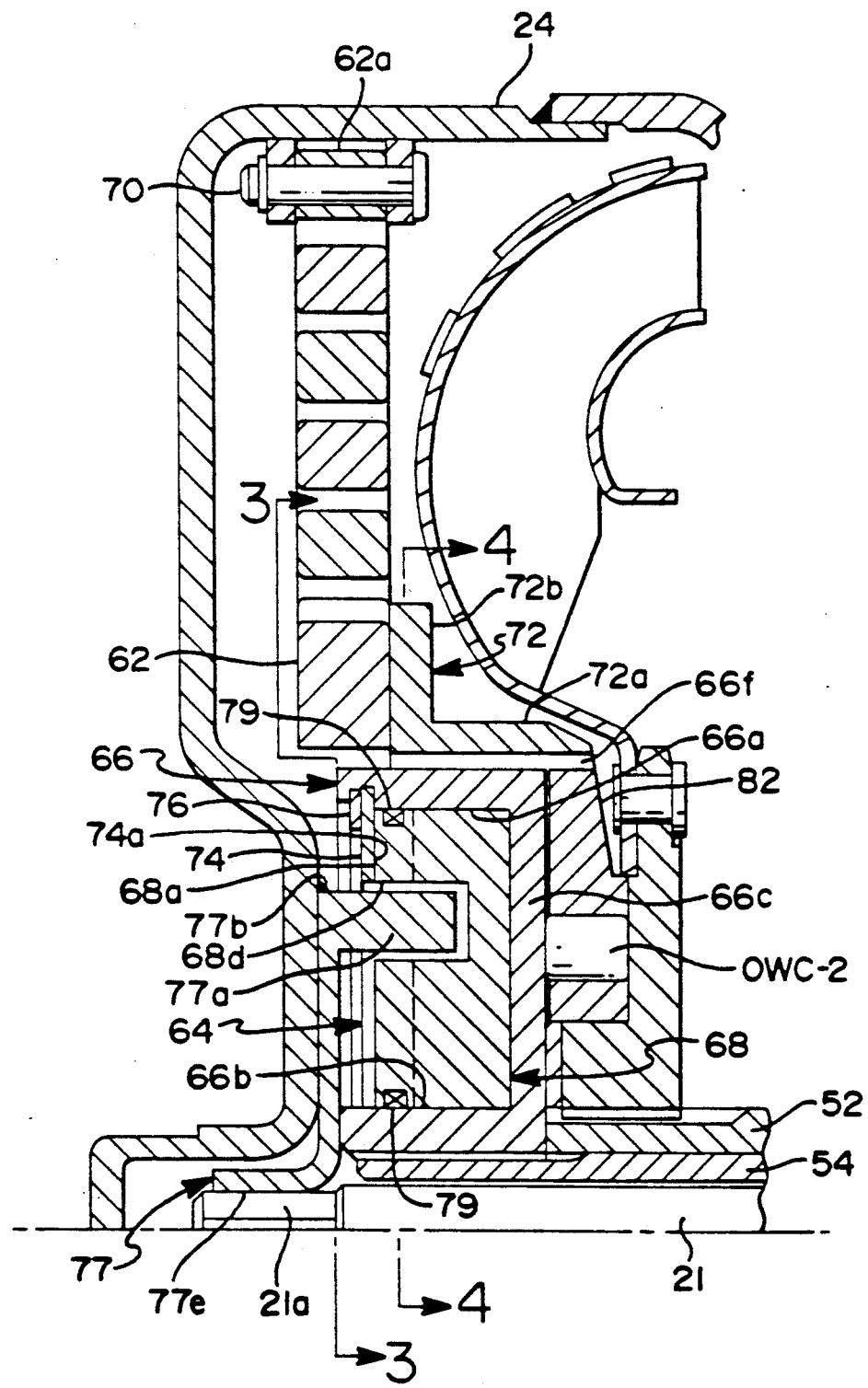
FIG. 2 is a partial, detailed, sectional view of the transmission of FIG. 1 with the torsion damping assembly also shown in detail.
Figure 3:
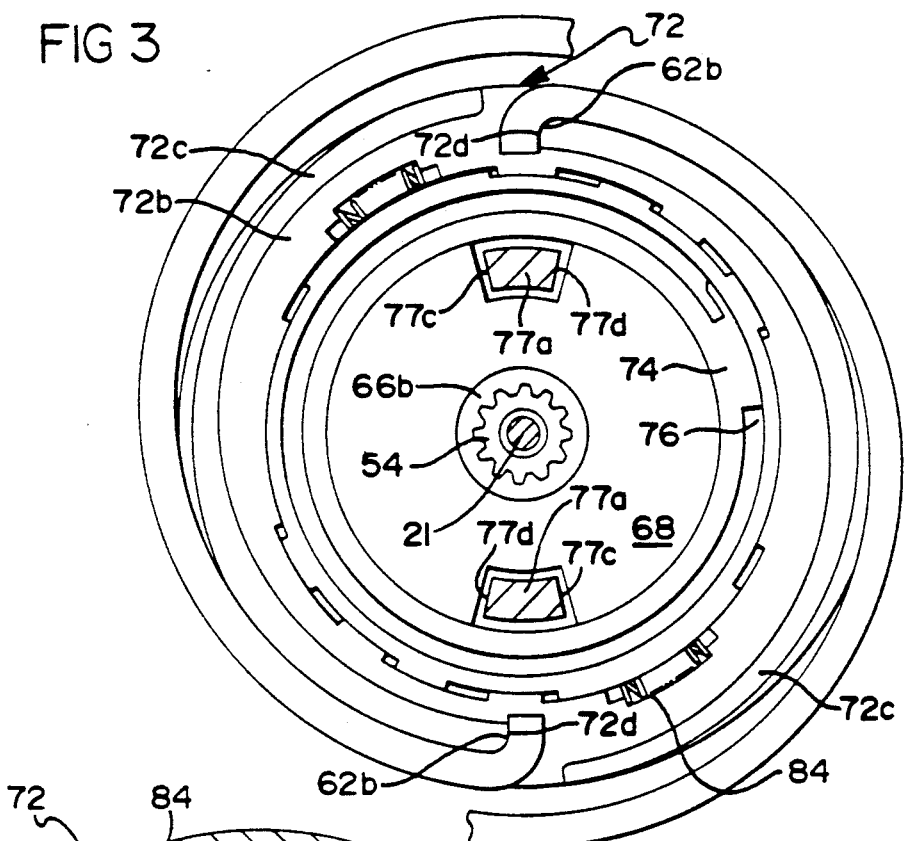
FIG. 3 is a partial, elevational view of the torsion damping assembly in relief and looking along line 3—3 of FIG. 2.
Figure 4:
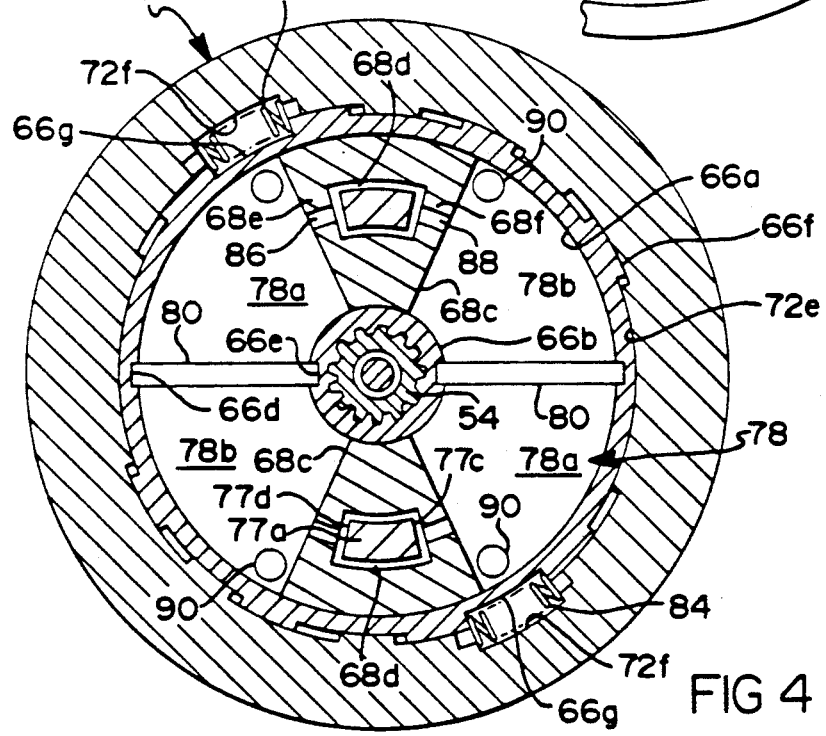
FIG. 4 is a partial, sectional view of a vane damper in the torsion damping assembly looking along line 4—4 of FIG. 2.

Looking now at the schematic representation of the torsion damping assembly 19 in FIG. 1 and in the more detailed illustration in FIGS. 2-4, assembly 19 is disposed within an annular compartment 24a defined by torque converter housing 24. Assembly 19 is immersed within the pressurized oil in compartment 24a. Spring assembly 20 includes two interdigitated, flat, torsion springs 62 flexible over a range of about fifty rotational degrees. Other types of long travel springs may be used. Vane damper assembly 22 includes an annular housing assembly 64 having first and second relatively rotatable housing members 66, 68.

Springs 62 are pivotally fixed at their radially outer ends 62a to torque converter housing 24 by pins 70 disposed 180 degrees apart; only one end 62a and one pin 70 are shown in the drawings. Radially inner ends 62b of springs 62 are drivingly connected or hooked to an annular connected as disclosed in U.S. Pat. No. 4,782,936 which is incorporated herein by reference. Bracket 72 includes a cylindrical or axially extending leg 72a, a radially extending leg 72b, and a pair of scroll-like flanges 72c extending axially from leg 72b. The scroll-like flanges are visible only in FIG. 3. Ends 62b of spring 62 hook over ends 72d of flanges 72c to effect the driving connection therebetween. Flanges 72c also radially support springs 62.

Member 66 includes axially extending cylindrical wall portions 66a, 66b and a radially extending annular wall portion 66c. Member 68 includes a radially extending annular wall disposed within the cylindrical walls 66a, 66b and retained therein by an annular thrust member 74 and a snap ring 76. The interface 68a, 74a of housing member 68 and thrust member 74 may be a bearing-like surface to minimize friction. However, the interface, preferably, frictionally interacts to provide a secondary torsion damping which increases in magnitude with increasing driveline torsionals, as explained in further detail herein after. Member 68 is drivingly connected to torque converter housing 24, in a manner explained further herein after, via a pair of lugs 77a extending axially from a bracket 77 welded at 77b to housing 24. Bracket 77 also includes a hexagonal opening 77e at its center which receives a hexagonal end 21a of pump shaft 21. Members 66, 68 define an annular compartment 78 containing oil from or of the type in torque converter compartment 24a. Compartment 78 is preferably sealed by seals 79 retained in grooves in member 68. As may be seen in FIG. 4, damper compartment 78 is divided into pairs of variable volume chambers 78a, 78b by pairs of partitions or vanes 80, 68c which respectively extend radially across the compartment. Vanes 80 are fixed to member 66 via axially extending grooves 66d, 66e in the cylindrically inner and outer surfaces of cylinder walls 66a, 66b. Vanes 68c are integrally formed with member 68 and extend axially therefrom into compartment 78. Adjacent relatively movable surfaces of the housing members and vanes are in sliding sealing relation to minimize and control fluid flow between the variable volume chambers. Housing member 66 is connected directly to external splines on quill shaft 54 via mating internal splines on cylindrical wall 66b. Housing member 66 and bracket 72 are drivingly interconnected for limited relative rotation via external splines 66f on cylindrical wall 66 and internal splines 72e on cylindrical leg 72a of the bracket. Bracket 72 is also connected to the outer race of a one-way clutch OWC-2 by a radially extending portion 82 of the race. The inner race of OWC-2 is fixed to turbine 32 and quill shaft 52. Splines 66f, 72e are circumferentially biased apart by a pair of helical compression springs 84 disposed in pairs of recesses 66g, 72f respectively defined by member 66 and bracket 72.

Figures 5, 6:
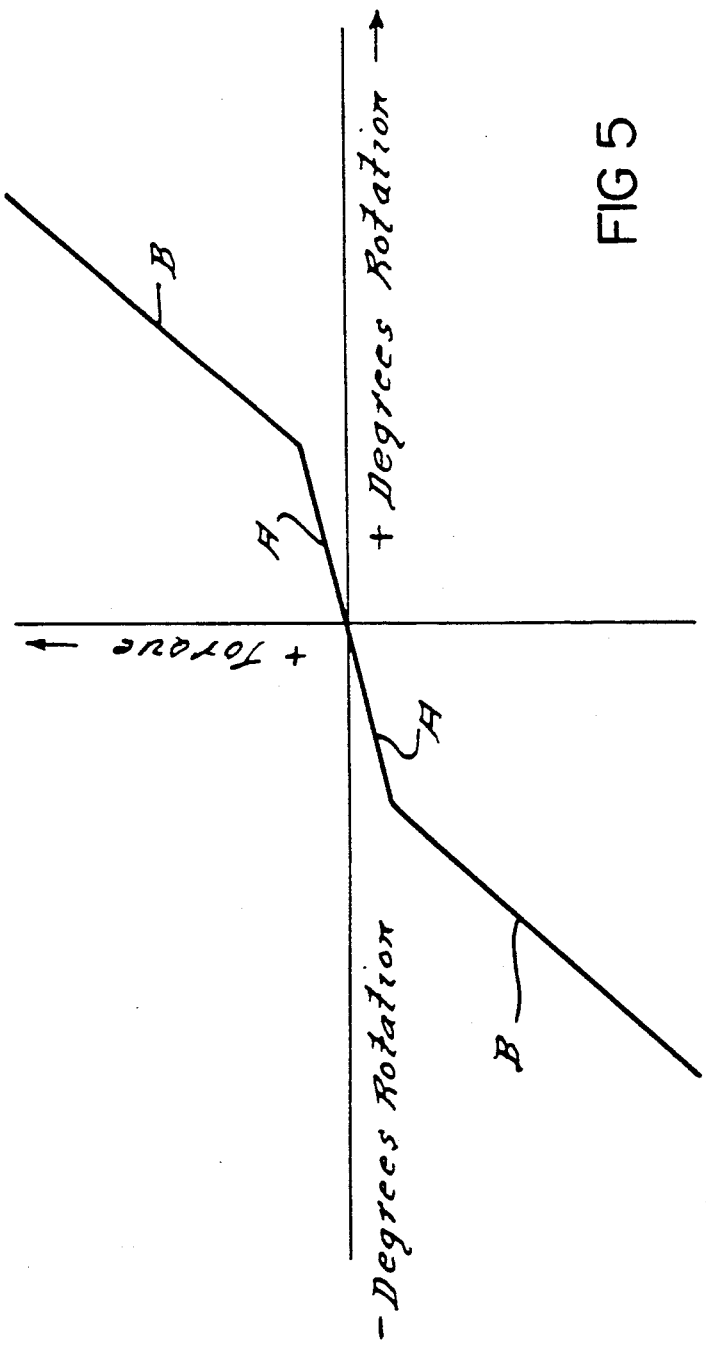
FIG. 5 is a graph schematically illustrating the spring rate characteristics of the torsion damping assembly in FIGS. 1—4.
FIG. 6 is a chart showing clutch and brake engagement for shifting the transmission of FIG. 1.

Springs 62 and 84 provide the torsion damping assembly 19 with two spring rates as schematically illustrated in FIG. 5. Springs 84 provide a relatively low spring rate represented by low slope curve A when the driveline torque is below a predetermined amount and a substantially greater spring rate represented by higher slope curves B when the driveline torque is above the predetermined amount.

Member 68 includes a pair of outwardly opening, arcuate recesses 68d formed in vanes 68c and having ends defined by surfaces of radially extending wall portions 68e, 68f. Restricted passages or orifices 86, 88 in wall portions 68e, 68f respectively communicate variable volume chambers 78a, 78b with the pressurized oil in torque converter compartment 24a via recesses 68d. Lugs 77a of bracket 77 extend into recesses 68d for drivingly connecting member 68 to torque converter housing 24. The lugs each include oppositely facing, radially extending surfaces or valving members 77c, 77d circumferentially spaced a predetermined number or rotational degrees from the mutually facing surfaces of wall portion 68e, 68f and aligned with the associated restricted passages.

The valving members 77c, 77d move into positions for closing or partially closing the passages associated with the variable volume chambers which, at any given time, are decreasing in volume, and which move away from the passages associated with the chambers increasing in volume. The amount of free play provided by the circumferential spacing between wall portions 68e, 68f and valving members 77c, 77d is preferably, but not limited to, an amount necessary to provide unrestricted flow of oil around the associated valving members, e.g., valving members 77c when valving members 77d are against their associated wall portions 68f. For the embodiment disclosed herein, a total free play two to four rotational degrees is adequate. Alternatively, the free play may be one-quarter to one-third the diameter of the passages 86, 88.

During an operational mode when the direction of torque is such that valving surfaces 77c move away from wall portions 68e and valving members 77d move into or toward contact with wall portions 68f, passages 86 are fully open and passages 88 are closed or partially closed. During such an operational mode, chamber 78a tends to increase or expand in volume and torque converter oil flows relatively freely thereto to prevent cavitation, and chamber 78b tends to decrease in volume and oil flow therefrom is either prevented or restricted enough to significantly effect a pressure rise therein which increases damping.

Operation of transmission 12 is in accordance with the FIG. 6 chart showing clutch and brake engagements to effect the reverse and forward speed ratio modes of operation. In first and reverse, 100% of driveline torque is transmitted to the ratio section via the torque converter (T/C). In second and third, 100% of the driveline torque is transmitted via torsion spring assembly (T/S)20. When the transmission is in third, clutch OWC-2 engages to provide a torque reaction for sun gear 40. While the transmission is in either second or third, driveline torsionals emanating from the engine are isolated or attenuated by the torsion spring assembly 20 and are damped by the shock absorbing or energy dissipating action of damper assembly 22 and by the variable friction forces at interfaces 68a, 74a of members 68, 74. For example, when torsionals cause a sudden relative rotation of first and second housing members 66, 68 such that chambers 78a decrease in volume and chambers 78b increase in volume, the energy in the torsionals is converted to an increase in the pressure of the oil in chambers 78a and somewhat of a decrease in the pressure of the oil in chambers 78b. The pressure increases are proportional to the rate of change of the torsionals and are greater than the pressure decreases. Elastomeric balls 90 in chambers 78a, 78b prevent contact of the vanes.

Figure 7:
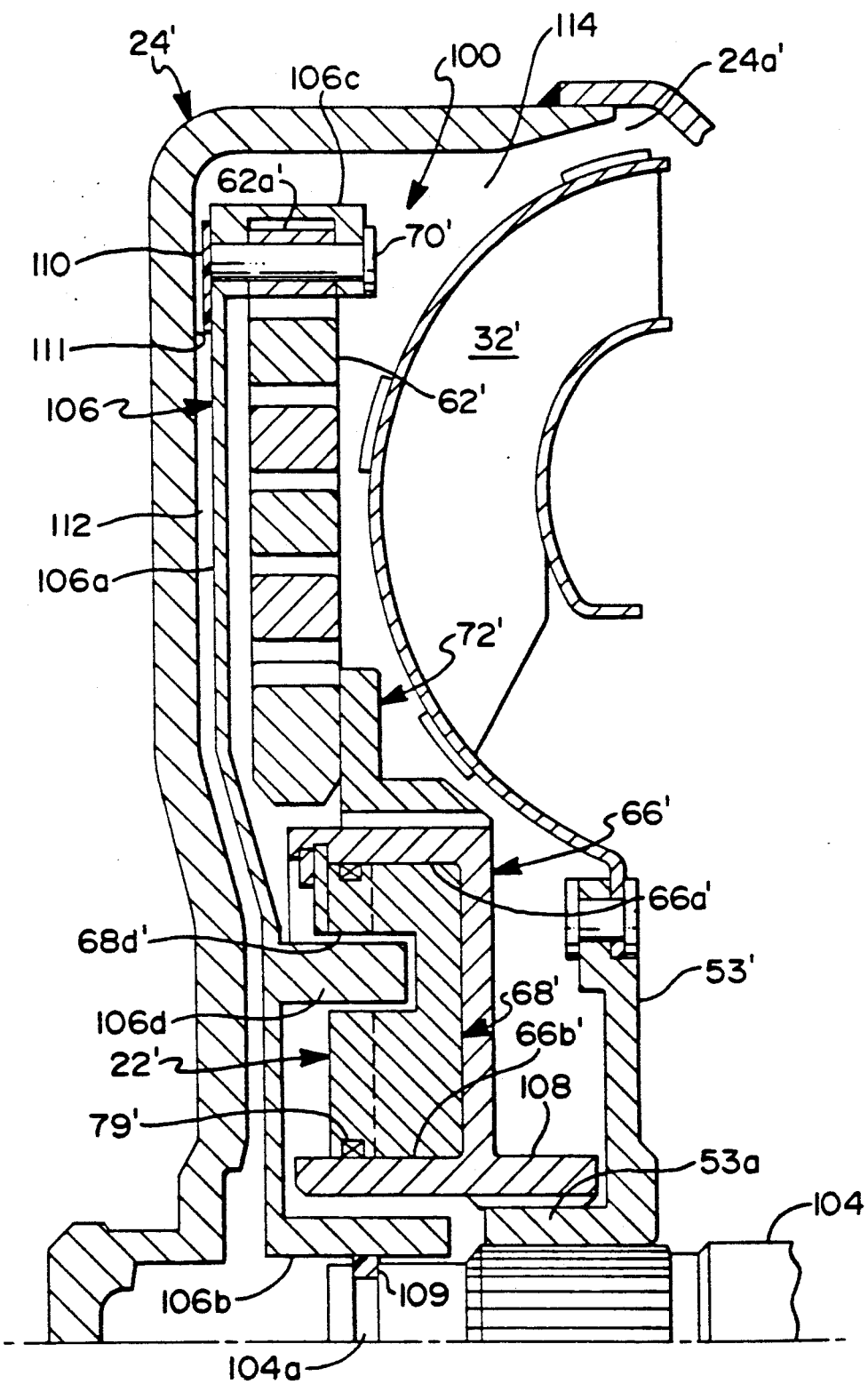
FIG. 7 is a modified embodiment of the torsion damping assembly.

Looking now at the modified embodiment of FIG. 7, therein elements which are substantially identical to elements in the previously described figures will be identified with the same reference numerals suffixed with a prime. The torsion damping assembly 100 of FIG. 7 embraces the principles of the damping assembly 19 but is modified to be frictionally clutched to the torque converter housing 24' to effect bypass of the torque converter to a shaft 104 which is normally driven by the torque converter turbine 32' via the member 53'. The modification consists mainly of the addition of a clutch plate 106, a cylindrical extension 108 of the inner cylindrical wall 66b' of the damper assembly 22'. Clutch plate 106 includes a radially extending portion 106a having an axially extending hub portion 106b at its radially inner edge and a U-like flange portion 106c at its radially outer edge. The inner surface of hub portion 106b is in sliding contact with an 0-ring seal 109 disposed in a groove 104a of shaft 104. The U-like flange portion 106c is connected to the radially outer ends 62a' of springs 62' by pins 70'. Clutch plate 106 includes an annular friction lining 110 bonded thereto and frictionally engagable with a confronting surface 111 of the torque converter housing. Clutch plate 106 includes a set of axially extending lugs 106d analogous to lugs 77a and received by recesses 68d'' in the second housing member 68'. The inner surface of cylindrical extension 108 is slidably splined to the outer surface of a hub portion 53a of member 53'. Clutch plate 106 divides torque converter 24a' into two chambers, a chamber 112 between the clutch plate and the radially extending portion of the torque converter housing, and a chamber 114 between the clutch plate and the torque converter.

During non-bypass operation of the torque converter in FIG. 7, pressurized transmission oil is admitted to the torque converter via chamber 112. The oil in chamber 112 prevents frictional engagement of the friction lining 110 with surface 111. The oil thus flows radially outward in chamber 112 past lining 110 and into chamber 114 for flow to the torque converter. When it is desired to engage torsion damping assembly 100, as, for example, when the vehicle is operating in a higher gear ratio and above a predetermined vehicle speed, the direction of flow of the pressurized oil is reversed by actuation of a suitable valve, not shown. Specifically, the pressurized oil is now admitted to chamber 114 where it acts against the radially extending portion 106a of clutch plate 106 and slides the entire damping assembly to the left to frictionally engage lining 110 with surface 111. Driveline torque now bypasses the torque converter and is transmitted to shaft 104 via the damping assembly. Since clutch plate 106 is not normally engaged when the engine is at idle, torsion damping assembly 100 does not require driving connections which suppress idle rattle. Hence, the loose spline connections to the outer periphery of the housing member 66 and to housing member 68 for suppression of idle rattle are not needed.

While the embodiments of the present invention have been illustrated and described in detail, it will be apparent that various changes and modifications may be made in the disclosed embodiments without departing from the scope or spirit of the invention. The appended claims are intended to cover these and other modifications believed to be within the spirit of the invention.

What is claimed is:

1. A torsion damping assembly adapted to be disposed in a driveline torque converter housing filled with incompressible torque converter fluid, immersed in the fluid, and drivingly connected between rotatably mounted input and output drives; the assembly including resilient means for transmitting driveline torque between the drives and an expandable chamber mechanism for hydraulically damping driveline torsionals; the mechanism including first and second relatively movable members, means for serially connecting the first member and the resilient means between the drives, and means for drivingly connecting the second member to one of the drives and in parallel driving connection with the resilient means; the members defining at least two chambers varying inversely in volume in response to flexing of the resilient means; passage means for communicating each of the volumes with the fluid in the torque converter housing; characterized by:

the means for drivingly connecting the second member to the one drive including valving means for at least partially closing the passage means communicating with the chamber decreasing in volume.

2. The assembly of claim 1, wherein the expandable chamber mechanism comprises:

a vane damper having an annular housing assembly defined by the first and second members, the members being concentric to a common axis being mounted for relative rotation, and having interior wall surfaces defining an annular chamber, the members each including a radially extending vane fixed thereto and disposed in the annular chamber, the members each including a radially extending vane fixed thereto and disposed in the annular chamber in sliding sealing relation with the interior wall surfaces of the other member for defining the variable column chambers;

the means for drivingly connecting the second member to the one drive including:

a recess in the vane of the second member, the recess opening outward the chamber and separated from the chamber by radially extending and circumferentially spaced apart wall portions of the vane, and the passage means including a circumferentially extending passage in each wall portion for communicating each chamber with the recess;

the means for drivingly connecting and the valving means defined by drive lugs fixed to the one drive and extending into the recess, each lug having circumferentially oppositely facing ends having a predetermined amount of circumferentially free play relative to the wall portions and aligned with the passages therein.

3. The assembly of claim 2, wherein the free play is less than four rotational degrees.

4. The assembly of claim 2, wherein the free play is about two rotational degrees.

5. The assembly of claim 2, wherein each passage has a predetermined diameter and the free play is less than one-quarter the diameter.

* * * * *